United States Patent [19]
Gardner

[11] 3,768,379
[45] Oct. 30, 1973

[54] SERVOMOTOR VACUUM SEAL
[75] Inventor: Delbert J. Gardner, South Bend, Ind.
[73] Assignee: The Bendix Corporation, South Bend, Ind.
[22] Filed: Aug. 14, 1972
[21] Appl. No.: 280,696

[52] U.S. Cl. .................................................. 92/99
[51] Int. Cl. .......................... F01b 19/00, F16j 3/00
[58] Field of Search........................... 92/96, 98, 99

[56] References Cited
UNITED STATES PATENTS
3,188,920   6/1965   Hager .............................. 92/99 X
3,352,209   11/1967  Cripe ............................... 92/99 X
3,656,413   4/1972   Eggstein........................... 92/99 X Primary Examiner—Martin P. Schwadron
Assistant Examiner—Abe Hershkovitz
Attorney—Leo H. Mc Cormick, Jr. et al.

[57] ABSTRACT

A servomotor having a front shell with an annular external surface which can vary from an ellipse to a circle joined to a concentric rear shell by a flange. The flange contacts the end plate of the rear shell and biases a peripheral bead of a diaphragm against a seat to seal the interior of the front and rear shells from the atmosphere.

7 Claims, 6 Drawing Figures

PATENTED OCT 30 1973 3,768,379

3,768,379

SERVOMOTOR VACUUM SEAL

BACKGROUND OF THE INVENTION

The available space under the hood of recently manufactured automobiles has been continually decreasing due to both the added accessories and required safety and pollution devices.

In automobiles equipped with one type of power brakes, a servomotor is required to provide an output force needed to operate the master cylinder. These servomotors usually comprise a cylinder or shell having a front section and a rear section joined together by a twist lock type connection similar to that shown in U.S. Pat. No. 3,109,346 with a reciprocable piston located therein which supplies the output force. This type of twist lock arrangement extends past the periphery of the shell resulting in additional needed installation space. Attempts have been made to develop a connection between the front and rear shell by the use of interlocking lugs which permit the diameter of the piston to be only negligibly smaller than the shells. In such a servomotor, the diaphragm of the piston has an external marginal portion which is approximately equal to the internal diameter of the front shell. The rear shell engages the marginal portion and presses the same against the internal diameter. However, in manufacturing the shells, eccentricity develops and if the shells are not matched, a vacuum leak can occur. In attempting to compensate for these eccentricities, a greater space between the lugs on the front shell and projections on the rear shell was provided to allow a small amount of radial rotation between these members to uniformly seat the marginal portion. However, with this arrangement, the edge of the marginal portion of the diaphragm is exposed to contaminants which can deteriorate the diaphragm over an extended period of time, again creating a condition where a vacuum leak can occur.

SUMMARY OF THE INVENTION

To reduce the overall outside diameter of a servomotor for operating the power brakes and judiciously utilizing the available under the hood space of a vehicle, I have devised a means for joining an annular wall section, whose surface can vary from an ellipse to a circle of a front shell with an annular closure means to provide a vacuum seal. The annular wall section has a closed end and an opened end. An inwardly projecting annular seat is secured adjacent the open end. A movable wall means located within the front shell is connected to a diaphragm means which has an external bead with a concentric external surface a predetermined size larger than said annular wall section. The bead has a slot on the inner face thereof which snaps over the peripheral edge of an end plate on the rear shell. The end plate with the bead surrounding its peripheral edge upon insertion in the opened end of the front shell causes the bead to resiliently flow against the inner surface of the annular wall section and form a radial seal. A closure means extending from the annular wall section covers the bead and engages the end plate to bias the bead against the seat to provide an axial vacuum seal between the front and rear shells.

It is therefore the object of this invention to provide a means for joining a front shell with a rear shell to provide a vacuum seal for a servomotor.

It is another object of this invention to compensate for eccentricity between a front shell and a rear shell through a resilient bead of a diaphragm having a diameter a predetermined size larger than the interior of the front shell and a slot on the interior thereof which surrounds the peripheral edge of the rear shell which positions the diaphragm against the interior of the front shell.

It is still another object of this invention to provide means for providing a vacuum seal between an annular front shell and a concentric rear shell.

These and other objects will be apparent from reading this specification and viewing the drawings.

DETAILED DESCRIPTION OF THE PREFERRED EMBODIMENT

Figure 1:
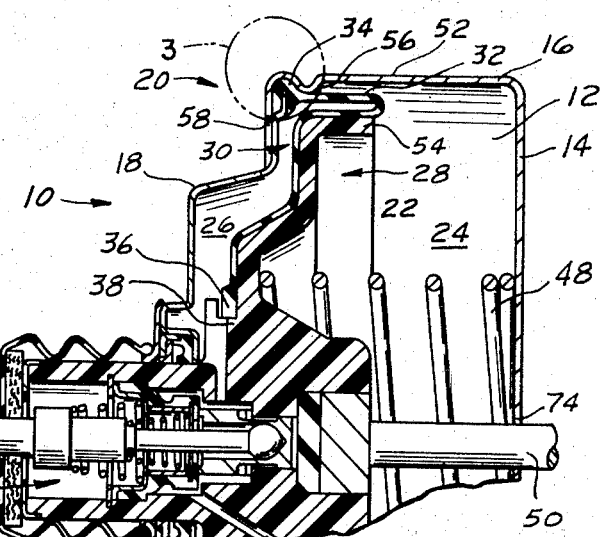
FIG. 1 is a sectional view of a servomotor having an annular wall section joined to a concentric end section to form a vacuum sealed chamber.

The fluid pressure servomotor 10 shown in FIG. 1 has a front shell 12 with a closed end 14 from which an annular wall section 16 extends rearwardly. The front shell 12 is joined to a rear shell 18 through a closure means 20 to form a sealed cavity 22. The sealed cavity 22 is divided into a vacuum chamber 24 and a control chamber 26 by wall means 28 and diaphragm means 30. The vacuum chamber 24 is connected to a source of vacuum usually by the intake manifold of a vehicle. The diaphragm means 30 has a rollable section 32 with a bead 34 on the end thereof retained by said closure means 20 and an internal lip 36 which snaps into a groove 38 on hub means 40. The hub means 40 retains valve means 42 in a manner fully described in U.S. Pat. No. 3,106,873 and incorporated herein by reference. The valve means 42 is responsive to an input from push rod 44 to interrupt the communication of vacuum from the front chamber 24 through passage 46 to the rear chamber 26 and allow air under pressure to flow into the rear chamber 26 to create a pressure differential across the wall means 28 and diaphragm means 30. This pressure differential creates a force which acts on the wall means 28 causing the wall means 28 to move by overcoming return spring 48 and supply an output force to push rod 50 which is connected to a master cylinder (not shown) in a braking system. As the wall means 28 moves, rollable section 32 of the diaphragm means 30 rolls itself out or off the forward surface 54 of the wall means 28 to continually change the volume of the control chamber 26.

Figure 3:
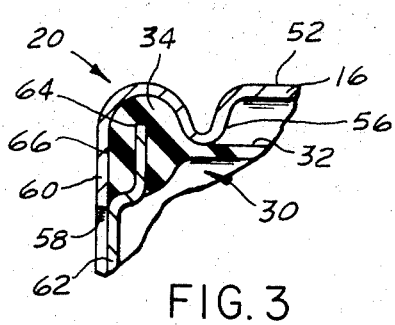
FIG. 3 is an enlarged sectional view of a closure means circumscribed section 3 of FIG. 1.
Figure 2:
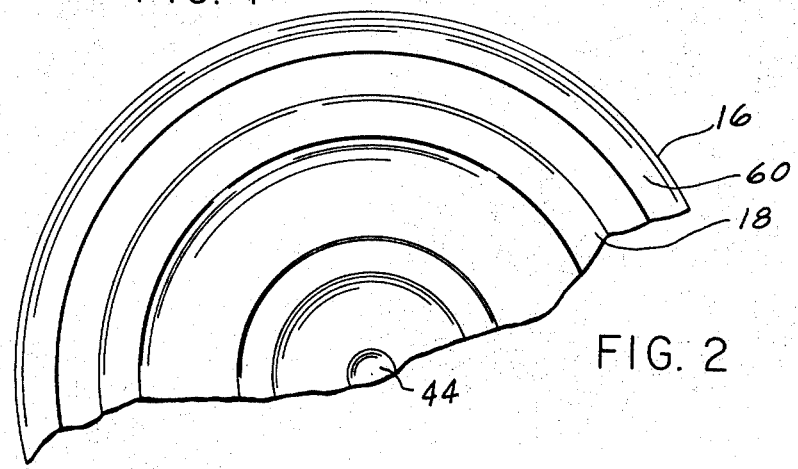
FIG. 2 is an end view of a servomotor as shown in FIG. 1 with a circular external surface.
Figure 5:
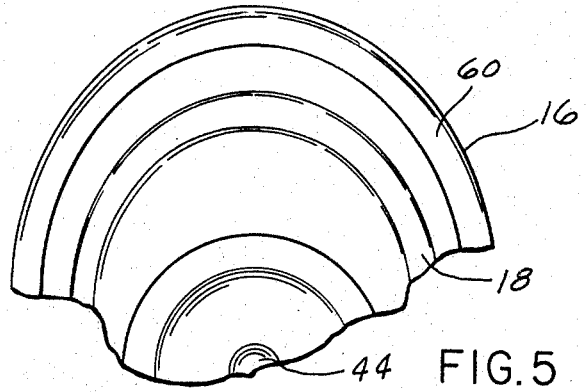
FIG. 5 is an end view of a servomotor as shown in FIG. 1 with an elliptical external surface.

An annular seat 56, see FIG. 3, is formed by a groove adjacent the end of the front shell 12 a predetermined distance from the opening 58. The bead 34 of the diaphragm means 30 is located on the outside of the seat 56. The bead 34 has an outside diameter concentric to the annular wall section 16 and a slot 64 along the inner surface thereof. The rear shell 18 has an end plate 62 with a peripheral edge 66 concentric to the annular wall section which extends into slot 64 and urges bead 34 against the interior of the conical wall section 52 to form a radial vacuum seal. The outside surface 52 of the annular wall section is a uniform surface throughout the entire length of the front chamber 24. Thus, the external surface of the servomotor will be exemplified by the shape of the shell which can vary from a circle as shown in FIG. 2 to that of an ellipse as shown in FIG. 5 to meet space conditions. The closure means 20 has a flange 60 which extends from the annular wall section 52 at substantially a right angle to engage end plate 62 to compress bead 34 against seat 56 as shown in FIG. 3 to form an axial vacuum seal.

By having the peripheral edge 66 bias the bead 34 against the interior of the annular wall section 16 and the flange 60 bias the bead 34 against seat 56, a double seal is achieved. This double seal will compensate for any eccentricity which may exist in the concentricity of the end plate and the annular wall section and thereby a vacuum seal can positively be achieved. The flange 60 completely covers the exterior of bead 34 as shown in FIG. 2 to prevent any outside contaminant from contacting the diaphragm and causing deterioration thereof.

Figure 4:
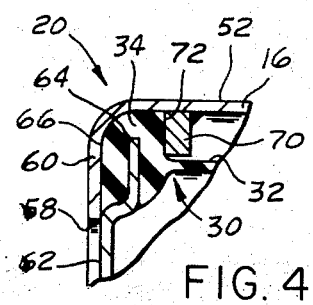
FIG. 4 is an enlarged sectional view of another embodiment of a closure means similar to that shown by FIG. 3.
Figure 6:
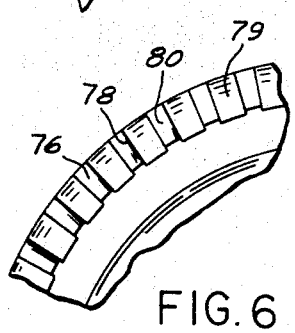
FIG. 6 is a partial end view of a conical front shell having slots in the peripheral surface thereof.

In the embodiments shown in FIGS. 4, 5 and 6 wherein elements are identical to that shown in FIGS. 1, 2 and 3 the same reference numeral is used.

In the embodiment shown in FIG. 4, the annular wall section 16 extends in a uniform curve throughout the entire length of the servomotor 10. An annular seat 70 is secured to the interior of the annular wall section 16 a predetermined distance from the open end 58. The peripheral edge 66 located in slot 64 will urge bead 34 against the annular wall section 16 while flange 60 will cover the bead 34 and press the edge 72 against annular seat 70 to achieve the double seal as recited above with reference to FIG. 1.

In some situations because of the thickness of the material from which the front shell 12 is constructed, it may be necessary to provide slots 76, see FIG. 6, along radial lines 78 extending from an axial line of the opening 74 in the front shell 12 to form tabs 79 and 80. The tabs 79 are successively bent over into contact with the end plate 62 while tabs 80 bias the bead 34 into contact with the annular seat 56 to develop the radial and axial vacuum seal for the front and rear chambers in the servomotor 10 as described above. The width of the slots 76 are such that in the position shown in FIG. 6, bead 34 is substantially covered to prevent contamination in the atmosphere from contacting the diaphragm.

To further utilize the available space under a vehicle's hood it may be occasioned that a servomotor whose outside surface 16 of the servomotor 10 follows a path of a point whose distance from two fixed points is constant or approaches an ellipse similar to that shown in FIG. 5 can be positioned where a servomotor whose outside surface is substantially circular to that in FIG. 2 will not fit. When an elliptically shaped servomotor is used, the annular wall section 16, the wall means 28, diaphragm means 30, and end plate 62 will have a common central axis which will permit the input push rod 44, hub means 40 and output push rod 50 to be in axial alignment as shown in FIG. 1. Thus, the same valve means 42 can be utilized in both the circular and elliptical shaped servomotors.

I claim:

1. A servomotor for use in a power braking system comprising:
    a front shell having a closed end with a rearwardly extending annular wall section terminating with an open end, said closed end having an axial opening therein;
    an inwardly projecting annular seat secured to said annular wall section a predetermined distance from said open end;
    wall means located in said front shell with an external surface concentric to said annular wall section, said wall means being adapted to move within said front shell toward said closed end;
    diaphragm means secured to said wall means having a rollable portion located between the external surface and said annular wall section with a bead on the end thereof, said bead being concentric to said annular wall section, said bead having a slot on an interior surface thereof;
    a rear shell having an end plate with a peripheral edge concentric to said annular wall section, said peripheral edge extending into said slot to position said bead against said annular wall section and form a first chamber between the front shell and the diaphragm means and a second chamber between the rear shell and the diaphragm means;
    said first and second chambers being connected to a source of vacuum;
    closure means extending from said annular wall section into contact with said end plate for biasing said bead into contact with said annular seat to seal the first and second chambers connected to vacuum from the atmosphere;
    resilient means located in said first chamber for urging said diaphragm means against said end plate of the rear shell; and
    control means responsive to an operator for interrupting the vacuum communication to the second chamber and allowing air under pressure into the second chamber for creating a pressure differential across said diaphragm and wall means, said pressure differential causing said wall means to move and transmit an operational force to an output rod retained in said axial opening.

2. The servomotor, as recited in cliam 1, wherein said annular wall section, said closed end, wall means, diaphragm means and end plate have a common central axis.

3. The servomotor, as recited in claim 2, wherein the edges of said annular wall section, external surface of said wall means, bead of said diaphragm and peripheral edge of said end plate each follow a corresponding concentric path of points respectively whose distance from two fixed points is constant.

4. The servomotor, as recited in claim 3, wherein said closure means includes:
    a series of tabs extending from the open end of said annular wall section, said tabs covering said bead to protect the diaphragm from deterioration.

5. The servomotor, as recited in claim 3, wherein said closure means includes:
    a continuous flange integral with said annular wall section, said flange completely covering said bead to protect the diaphragm means from deterioration.

6. The servomotor, as recited in claim 5, wherein said flange and annular seat compress said bead causing the bead to resiliently flow against said annular wall section and peripheral edge of the end plate to create a vacuum seal.

7. The servomotor, as recited in claim 2, wherein the edges of said annular wall section, external surface of said wall means, bead of said diaphragm and peripheral edge of said end plate follow corresponding concentric plan curves that approximate an ellipse.

* * * * *